(12) United States Patent
Roberto et al.

(10) Patent No.: US 11,599,699 B1
(45) Date of Patent: Mar. 7, 2023

(54) SYSTEM AND METHOD FOR AUTONOMOUS PRINTED CIRCUIT BOARD DESIGN USING MACHINE LEARNING TECHNIQUES

(71) Applicant: Cadence Design Systems, Inc., San Jose, CA (US)

(72) Inventors: Luke Roberto, Brookline, MA (US); Joydeep Mitra, Austin, TX (US); Taylor Elsom Hogan, Boston, MA (US); Shang Li, Wakefield, MA (US); Zachary Joseph Zumbo, Brookline, MA (US); John Robert Murphy, Boston, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 469 days.

(21) Appl. No.: 16/785,972

(22) Filed: Feb. 10, 2020

(51) Int. Cl.
  *G06F 30/30* (2020.01)
  *G06F 30/31* (2020.01)
  *G06N 3/04* (2023.01)
  *G06N 3/08* (2023.01)
  *G06F 115/12* (2020.01)

(52) U.S. Cl.
  CPC .............. *G06F 30/31* (2020.01); *G06N 3/04* (2013.01); *G06N 3/08* (2013.01); *G06F 2115/12* (2020.01)

(58) Field of Classification Search
  CPC ....... G06F 30/31; G06F 2115/12; G06N 3/04; G06N 3/08
  See application file for complete search history.

(56) References Cited

U.S. PATENT DOCUMENTS

| | | | |
|---|---|---|---|
| 2015/0106310 A1* | 4/2015 | Birdwell | G06N 3/086 706/26 |
| 2020/0174463 A1* | 6/2020 | Cella | G06N 3/0472 |

* cited by examiner

*Primary Examiner* — Jack Chiang
*Assistant Examiner* — Brandon Bowers
(74) *Attorney, Agent, or Firm* — Mark H. Whittenberger; Holland & Knight LLP

(57) ABSTRACT

The present disclosure relates to systems and methods for floorplanning using machine learning techniques. Embodiments may include receiving an electronic design and analyzing the electronic design using a reinforcement learning agent. Embodiments may further include recommending a first action wherein the first action includes at least one of a place agent action, a via agent action, or a route agent action. Embodiments may also include updating the electronic design based upon, at least in part, the first action to generate an updated electronic design. Embodiments may further include analyzing the updated electronic design using the reinforcement learning agent and recommending a second action wherein the second action includes at least one of a place agent action, a via agent action, or a route agent action. Embodiments may also include updating the updated electronic design based upon the second action to generate a second updated electronic design.

20 Claims, 6 Drawing Sheets

SYSTEM AND METHOD FOR AUTONOMOUS PRINTED CIRCUIT BOARD DESIGN USING MACHINE LEARNING TECHNIQUES

GOVERNMENT RIGHTS

This invention was made with Government support under Agreement No. HR0011-18-3-0010, awarded by DARPA. The Government has certain rights in the invention.

FIELD OF THE INVENTION

The present disclosure relates to electronic circuit design and, more specifically, to systems and methods for autonomous printed circuit board design using machine learning techniques.

DISCUSSION OF THE RELATED ART

Despite over 35 years of development effort from industry and the academic sector, the design of printed circuit boards ("PCBs") and packages remain a very manual and human effort. The reasons span from behavioral to technical, but it is clear that the lack of automation in electronic design automation ("EDA") is limiting quality and time to market. Various PCB design problems have human and algorithmic strategies associated with them. The human strategies are learned through years of trial and error, and through shared knowledge with other designers.

SUMMARY

In one or more embodiments of the present disclosure a computer-implemented method for floorplanning using machine learning techniques is provided. The method may include receiving an electronic design and analyzing the electronic design using a reinforcement learning agent. The method may further include recommending a first action wherein the first action includes at least one of a place agent action, a via agent action, or a route agent action. The method may also include updating the electronic design based upon, at least in part, the first action to generate an updated electronic design. The method may further include analyzing the updated electronic design using the reinforcement learning agent and recommending a second action wherein the second action includes at least one of a place agent action, a via agent action, or a route agent action. The method may also include updating the updated electronic design based upon the second action to generate a second updated electronic design.

One or more of the following features may be included. The reinforcement learning agent may be a hierarchical reinforcement learning agent configured to construct a hierarchy of policies or agents to decompose a design task associated with the electronic design. Analyzing the electronic design or analyzing the second electronic design may include analyzing one or more of an image, a scalar, or a graph. Analyzing may include analyzing at least one of a primitive action or a complex action. The method may further include applying a neural network to approximate board routeability for use as a fitness function or a reward function. The method may also include receiving a completed design and analyzing the completed design using the reinforcement learning agent. The method may further include applying a reward function to the reinforcement learning agent.

In yet another embodiment of the present disclosure a non-transitory computer-readable storage medium having stored thereon instructions, which when executed by a processor result in one or more operations is provided. Operations may include receiving an electronic design and analyzing the electronic design using a reinforcement learning agent. Operations may further include recommending a first action wherein the first action includes at least one of a place agent action, a via agent action, or a route agent action. Operations may also include updating the electronic design based upon, at least in part, the first action to generate an updated electronic design. Operations may further include analyzing the updated electronic design using the reinforcement learning agent and recommending a second action wherein the second action includes at least one of a place agent action, a via agent action, or a route agent action. Operations may also include updating the updated electronic design based upon the second action to generate a second updated electronic design.

One or more of the following features may be included. The reinforcement learning agent may be a hierarchical reinforcement learning agent configured to construct a hierarchy of policies or agents to decompose a design task associated with the electronic design. Analyzing the electronic design or analyzing the second electronic design may include analyzing one or more of an image, a scalar, or a graph. Analyzing may include analyzing at least one of a primitive action or a complex action. Operations may further include applying a neural network to approximate board routeability for use as a fitness function or a reward function. Operations may also include receiving a completed design and analyzing the completed design using the reinforcement learning agent. Operations may further include applying a reward function to the reinforcement learning agent.

In one or more embodiments of the present disclosure a system for floorplanning using machine learning techniques is provided. The system may include at least one processor configured to receive an electronic design. The at least one processor may be further configured to analyze the electronic design using a reinforcement learning agent and to recommend a first action, wherein the first action includes at least one of a place agent action, a via agent action, or a route agent action. The at least one processor may be further configured to update the electronic design based upon, at least in part, the first action to generate an updated electronic design. The at least one processor may be further configured to analyze the updated electronic design using the reinforcement learning agent and to recommend a second action wherein the second action includes at least one of a place agent action, a via agent action, or a route agent action. The at least one processor may be further configured to update the updated electronic design based upon, at least in part, the second action to generate a second updated electronic design.

One or more of the following features may be included. The reinforcement learning agent may be a hierarchical reinforcement learning agent configured to construct a hierarchy of policies or agents to decompose a design task associated with the electronic design. Analyzing the electronic design or analyzing the second electronic design may include analyzing one or more of an image, a scalar, or a graph. Analyzing may include analyzing at least one of a primitive action or a complex action. The at least one processor may be further configured to apply a neural network to approximate board routeability for use as a fitness function or a reward function. The at least one processor may be further configured to receive a completed design and analyzing the completed design using the reinforcement learning agent. The at least one processor may be further configured to apply a reward function to the reinforcement learning agent.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
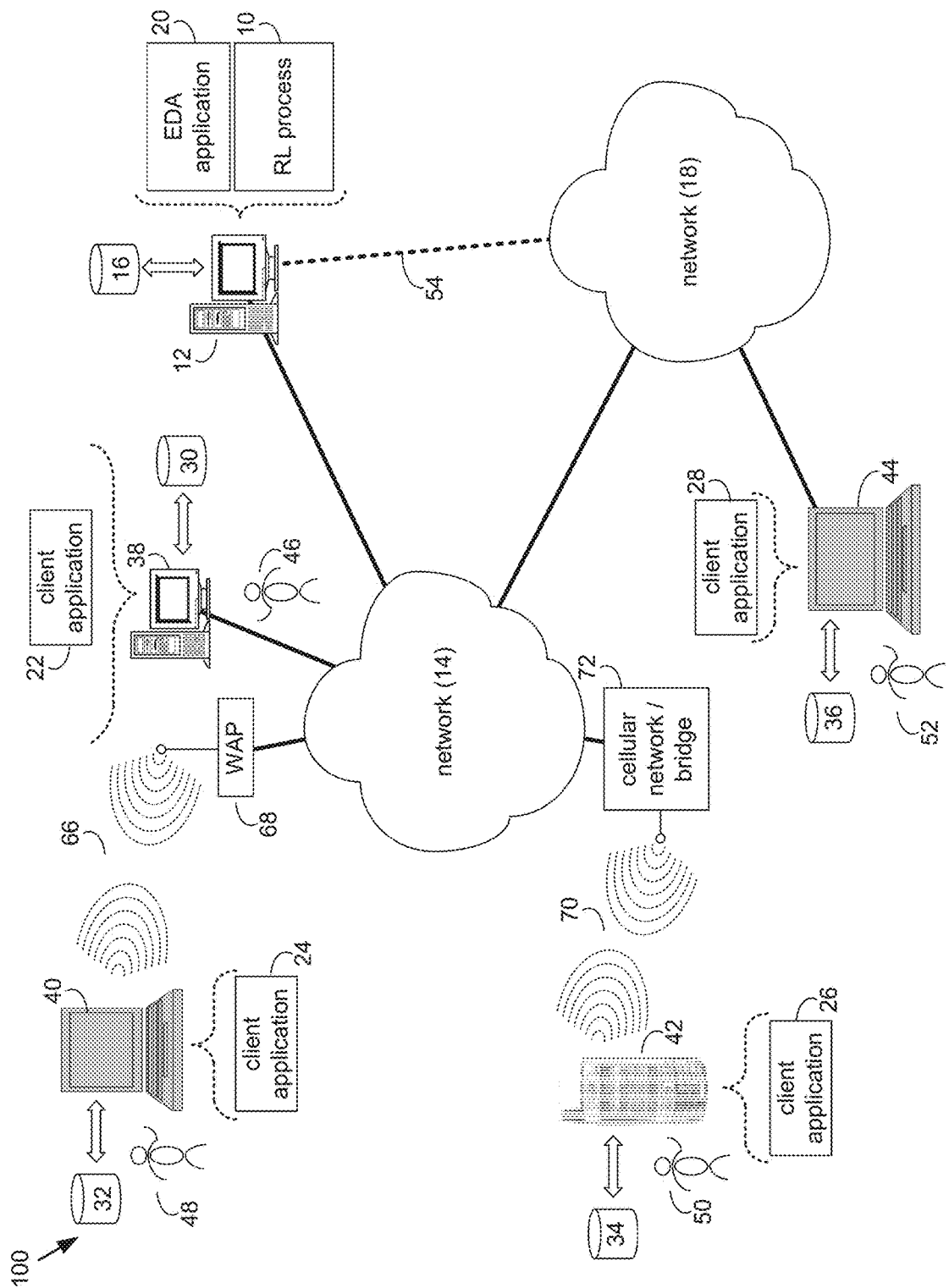
FIG. 1 is a diagram depicting an embodiment of a system in accordance with the present disclosure.

Embodiments of the present disclosure are directed towards systems and methods for reframing the PCB floor-planning process into an iterative design process under a machine learning framework. In some embodiments, a hierarchical reinforcement learning (RL) agent may take the current state of a design and recommend abstract "actions" to take in order to iteratively move the design towards closure, whether that be routeability or some other metric. This provides a robust and flexible system to allow system designers to specify different design considerations to our tool.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Referring to FIG. 1, there is shown a reinforcement learning process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, reinforcement learning process 10 may reside on and be executed, in whole or in part, by a client electronic device, such as a personal computer, notebook computer, personal digital assistant, or the like.

The instruction sets and subroutines of reinforcement learning process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Reinforcement learning process 10 may be a standalone application, or may be an applet/application/script that may interact with and/or be executed within EDA application 20. In addition/as an alternative to being a server-side process, reinforcement learning process 10 may be a client-side process (not shown) that may reside on a client electronic device (described below) and may interact with an EDA client application (e.g., one or more of EDA client applications 22, 24, 26, 28). Further, reinforcement learning process 10 may be a hybrid server-side/client-side process that may interact with EDA application 20 and an EDA client application (e.g., one or more of client applications 22, 24, 26, 28). As such, reinforcement learning process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM);

read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize reinforcement learning process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
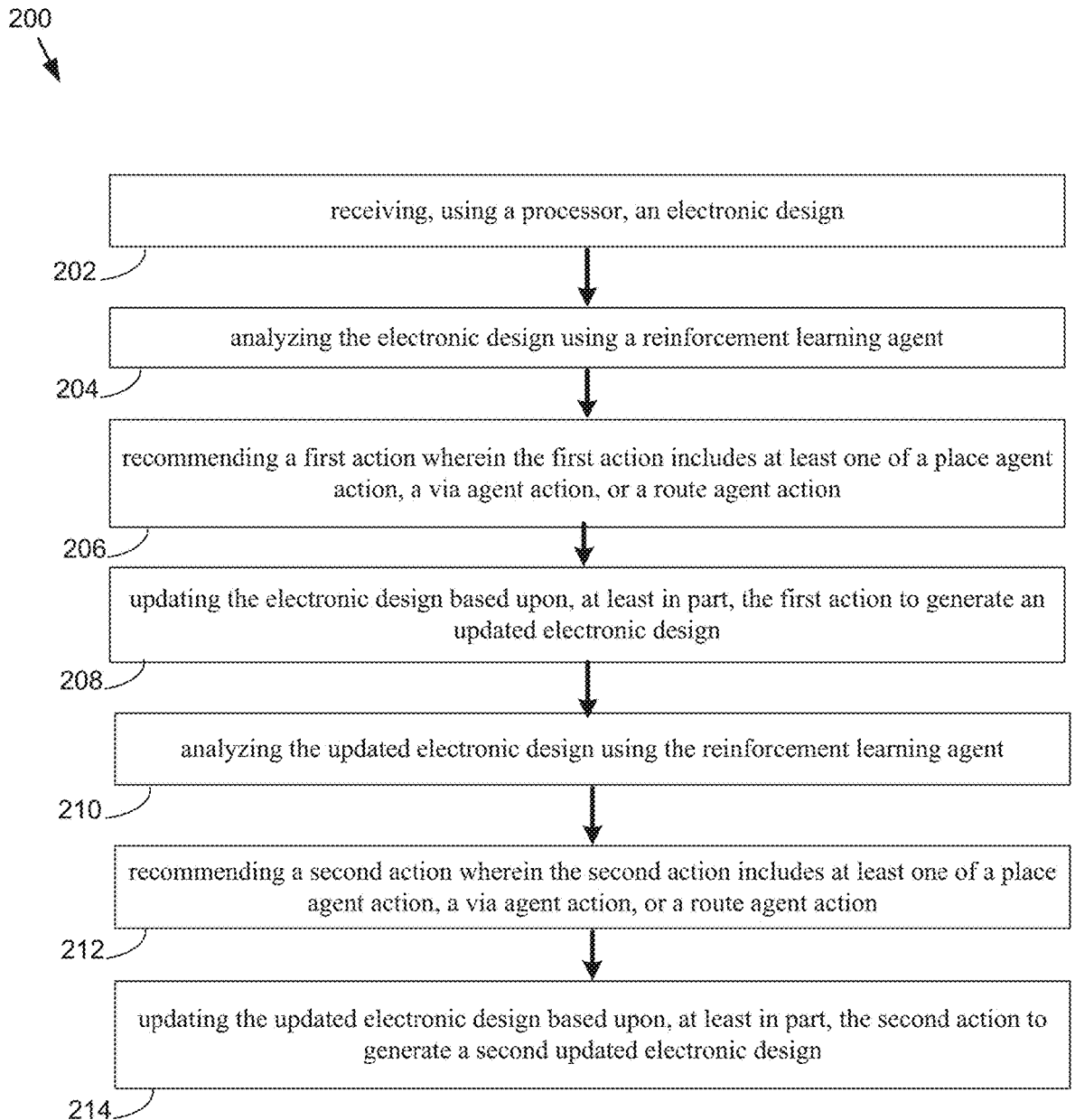
FIG. 2 is a flowchart depicting operations consistent with the reinforcement learning process in accordance with an embodiment of the present disclosure.

Referring now to FIG. 2, an exemplary flowchart 200 depicting operations for use in accordance with reinforcement learning process 10 is provided. Embodiments may include receiving (202) an electronic design and analyzing (204) the electronic design using a reinforcement learning agent. The method may further include recommending (206) a first action wherein the first action includes at least one of a place agent action, a via agent action, or a route agent action. The method may also include updating (208) the electronic design based upon, at least in part, the first action to generate an updated electronic design. The method may further include analyzing (210) the updated electronic design using the reinforcement learning agent and recommending (212) a second action wherein the second action includes at least one of a place agent action, a via agent action, or a route agent action. The method may also include updating (214) the updated electronic design based upon the second action to generate a second updated electronic design.

The term "placement", as used herein, may refer to the process of placing discrete components on the surfaces (e.g., top, bottom or embedded) of a PCB such that certain physical design metrics are optimized. Such metrics may include, but are not limited to, wire length, component density (e.g., spread) and congestion of signal wires. All existing optimization metrics used in traditional placement algorithms today are but approximations and abstractions of the ideal metric of routeability. These systems are optimizing for proxies of this true metric and thus solutions returned by these have no guarantees of returning boards that are actually routeable. If a system were to directly optimize routeability, routing closure would be directly optimized in the system. As used herein, the term "routeability" may refer to the fraction of total connections that may be legally routed satisfying all design rule checks/constraints ("DRCs"). Unfortunately, it is intractable to use routeability as a metric since this would involve running a computationally expensive router at every step in the placement process.

Accordingly, embodiments of the present disclosure may utilize machine learning techniques as a powerful function approximator. In some embodiments, RL process 10 may be configured to train a machine learning model offline in a distributed fashion on a continually growing corpus of boards and their routed counterparts. The feature vector for the model may include a combination of images (e.g., both detailed and abstract design representations) and scalars (e.g., board dimensions, wire length, number of nets, number of packages vs discrete components, etc.). The scalars may serve to normalize the design space across a large cross section of PCBs. This trained machine learning model may now be used to infer routeability during the inner steps of the placement algorithm thus accelerating true routing closure.

Figure 3:
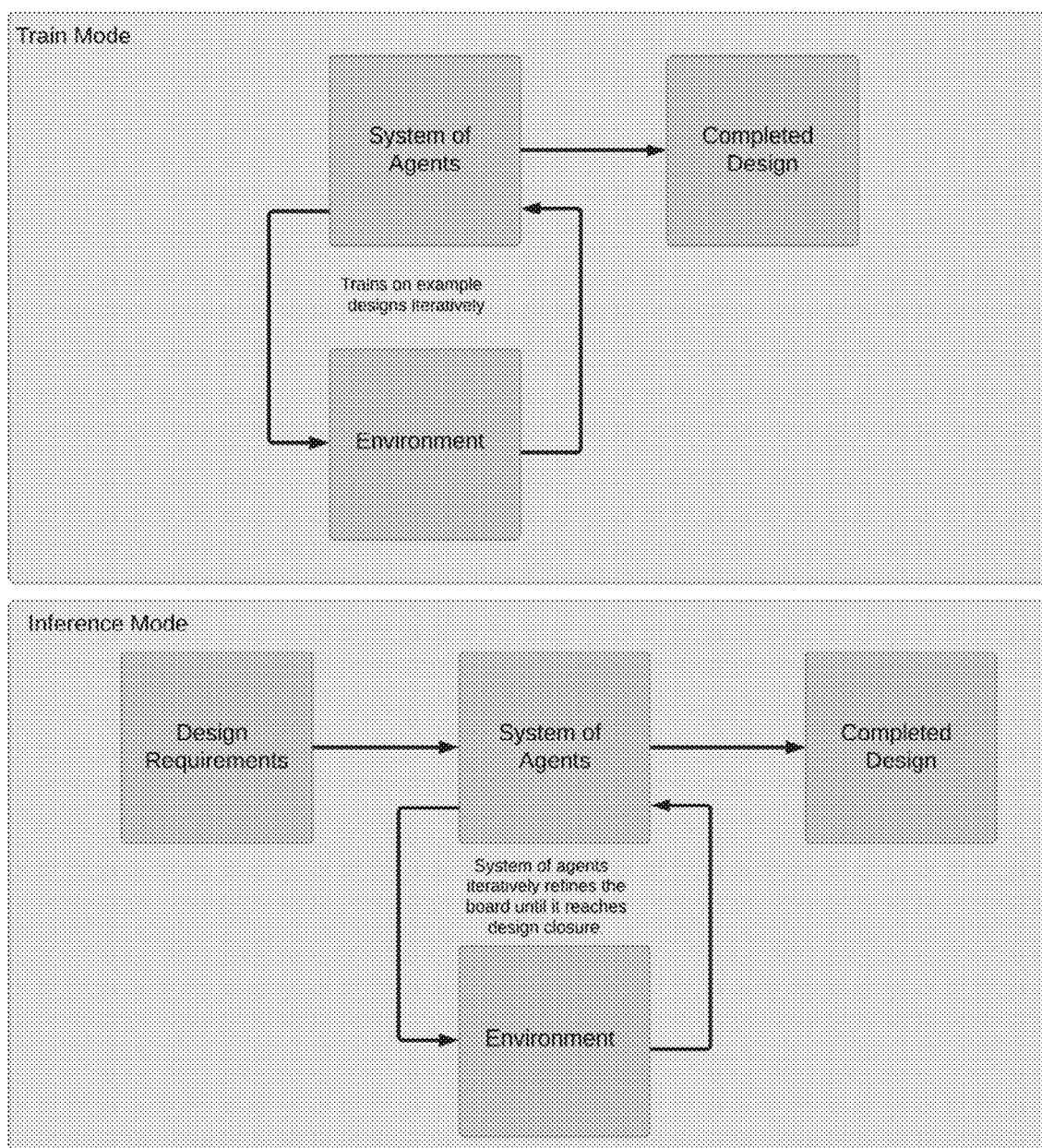
FIG. 3 is a flowchart depicting one example flow of information throughout the system in accordance with an embodiment of the present disclosure.

Referring now to FIG. 3, an exemplary flowchart depicting the flow of information throughout the system is provided. The reinforcement learning agent observes the state of the design (combination of images, scalars, and graphs) and then chooses a corresponding action to perform on the board. This runs iteratively until the board reaches design closure. A distinction should be made between training and inference modes. In some embodiments, the training mode may entail training on a repository of designs. The inference mode may then run the agent on designs it has not seen before, running iteratively until the board reaches design closure.

In some embodiments, RL process 10 may apply one or more via strategies according to the teachings of the present disclosure. The application of via strategies may include the process of assigning layers to the various connections in a PCB. This may include, but is not limited to, including layer transitions within single connections to enable routing closure. This layer assignment step may again be formulated as an optimization problem with the ideal cost function being maximization of routeability. This problem differs from the placement problem above with the introduction of a variable number of layers along with layer width and clearance constraints which complicates the above approach of training an machine learning model.

Embodiments of the present disclosure may be configured to train a machine learning model with similar images as above but using a single layer feature vector for each training sample. The training sample would thus include images pertaining to all vias and connections for a single assigned layer along with all the above scalars with the addition of layer-based constraints (width and clearance) for this single layer as well. The training label would again be a global router generated routeability metric for this layer. This trained model may now be used to infer the routeability for a single layer given the corresponding feature vector. The cost would then be a function of all the inferred routeability metrics for the current layer assignment across all layers.

Problems in reinforcement learning may be posed as Markov Decision Processes (MDPs), defined by a tuple: (S, A, R, T). The set S refers to the set of states, the set A refers to set of actions that the agent can take in its environment, the function R is the reward function that takes a state and an action pair to return a scalar value, and the function T is the transition model of the environment that takes a state and an action pair to return a new state of the environment. The goal of the reinforcement learning agent is to develop a policy, which is a function that takes in the current state and returns either an action or a distribution over actions. The policy the RL agent develops is one which maximizes the expected discounted cumulative rewards over a sequence of states.

In some embodiments, machine learning may include, but is not limited to, supervised learning, reinforcement learning, and unsupervised learning. They may be defined by their varying levels of supervision in the learning problem, so on one end of the spectrum supervised learning may be concerned with giving an agent a set of data and labels and learning a mapping between them, while unsupervised learning may receive a set of data and learn the structure of that data. Reinforcement learning is in the center of the spectrum as the agent may not be given exact labels for the data, but some sort of light supervision may be given in the form of the reward.

Figure 4:
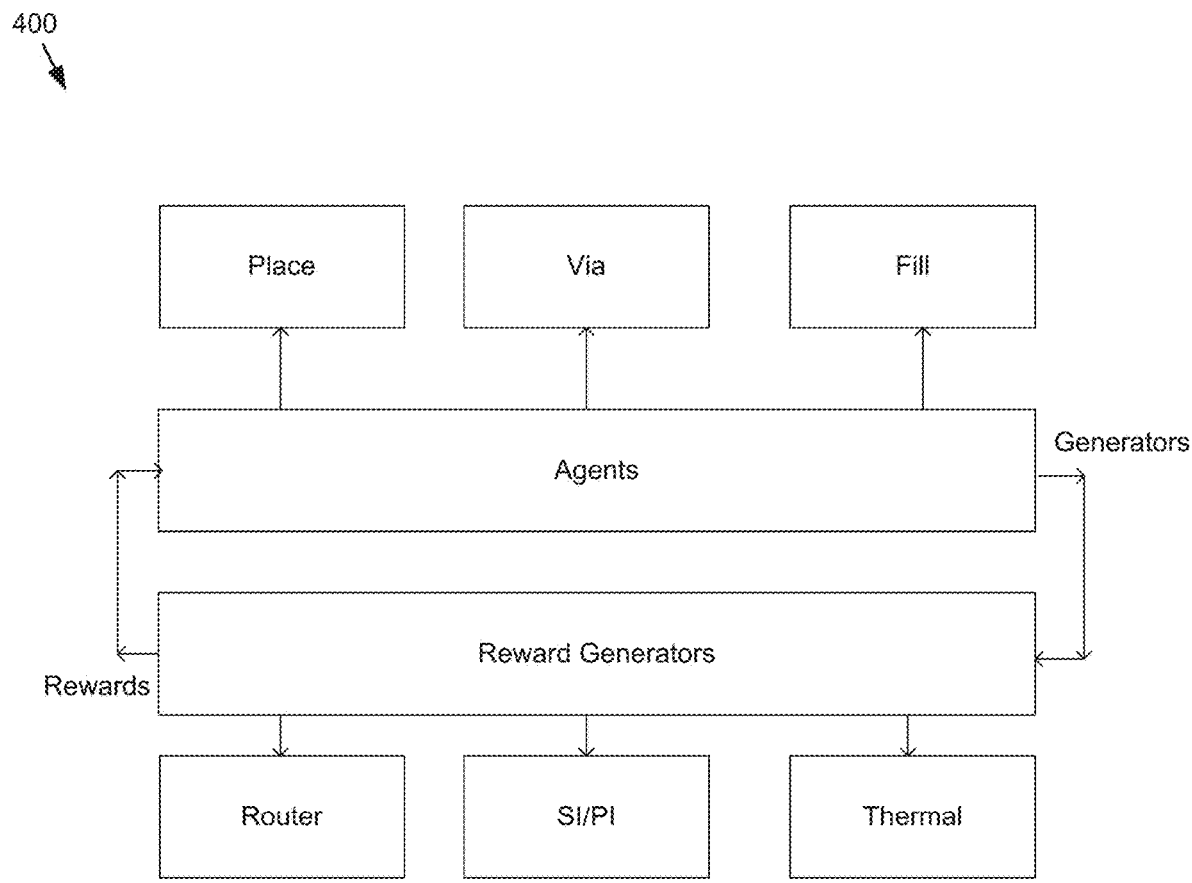
FIG. 4 is a flowchart depicting another example flow of information throughout the system in accordance with an embodiment of the present disclosure.

Referring now to FIG. 4, a flowchart depicting an alternative flow of information throughout the system is provided. This alternative flow chart reframes the learning loop as a flexible system of agents and reward generators. The agents interact with the design through its actions. These actions are then graded by the reward generators under the evaluation of different important metrics like Routeability, SI/PI, and Thermal.

Reinforcement learning may be distinct from the other two types of learning because the problem may be framed as the agent collecting its own data. The mapping may be learned incrementally from all the data it collects over time. Embodiments included herein may utilize reinforcement learning problem since the design space of PCB design may be exponentially large in the number of components, board size, and connectivity of the netlist—much too large to collect data in a supervised setting and much too complex to discover structured learning through unsupervised learning. Reinforcement learning may be viewed as a search algorithm that can learn progressively better heuristics under a given reward function over time.

The generic description of the reinforcement learning problem is a bit too general and not quite suited for our problem domain. As noted above, the design space is exponentially large in several factors, and the possible actions that a design agent can take in this environment is also prohibitively large. Any existing reinforcement learning approaches will not provide good performance as it is almost impossible for the agent to learn effectively under these conditions. Accordingly, embodiments of reinforcement learning process 10 may utilize major optimizations to improve a learning agent in this domain. Some of these may include, but are not limited to, hierarchical reinforcement learning, imitation learning, and learning with options.

Figure 5:
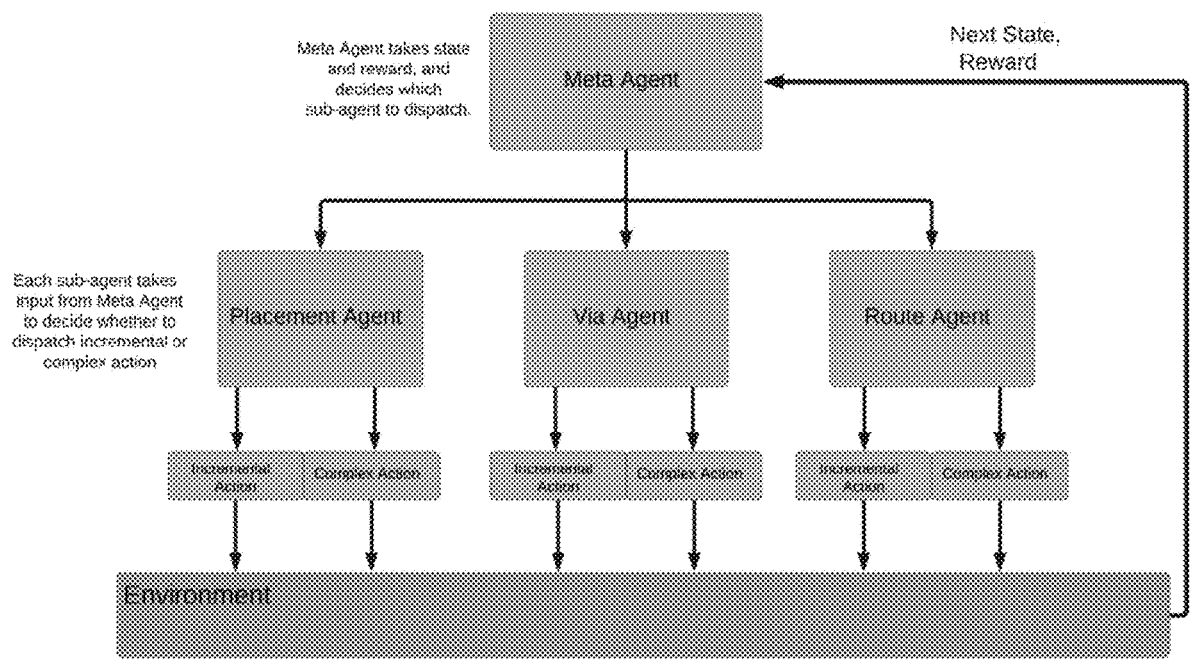
FIG. 5 is a diagram depicting a system of meta-agents in accordance with an embodiment of the present disclosure.

Referring now to FIG. 5, a diagram depicting a system of meta-agents is provided. The figure depicts the system of agents described above. The meta agent takes the current state of the design and decides which agent should be dispatched to improve the board design. For example, if placement is influencing some issues in routing, the agent might dispatch the Place agent to move a component to some better-suited location. FIG. 5 shows that the meta agent takes the state of the design with the reward, and decides which agent to dispatch. The sub agents may also decide whether or not to dispatch an incremental or complex action.

Hierarchical Reinforcement Learning (HRL) is an alternative approach to the MDP problem that constructs a hierarchy of policies, or agents, in order to decompose complex problems into ensembles of simpler ones. Embodiments included herein may utilize concepts associated with meta-learning shared hierarchies and the hierarchical actor-critic. Using a hybrid of these frameworks, embodiments included herein may be configured to decompose the policy into a hierarchy of simpler polices that will operate on a specific task. These approaches also extend the MDP definition to include agent "goals", so a policy may be conditioned on a goal. This allows agents in a hierarchy to modulate their policies to achieve goals given to them by agents above them. For example, RL process 10 may be configured to have an agent trained to take a placed board and a goal to choose an action that refines the current placement to achieve a goal, like incremental improvement in routeability. Once RL process 10 has trained separate agents on each task, it may then use a meta-agent to learn how to efficiently dispatch goals to each of the lower level agents. This helps solve the larger scale problem by iteratively refining sub problems that build up to a solution of the joint problem.

In some embodiments, RL process 10 may use a slightly adjusted framework of reinforcement learning called the options framework. An option is a collection of primitive actions, they can also be thought of as a micro-policy that represents some more complicated action. For example, if the goal is to schedule a connection to be routed on a specific layer, there are several primitive actions that need to happen on a design to move this connection. An option here would parameterize these primitive actions so the agent would simply have access to the "schedule connection on layer i" action. Instead of formulating the problem as an MDP, embodiments included herein may formulate the problem as a semi-Markov decision process (SMDP), where the time steps between state changes may vary depending on the length of the complex actions. The lowest agents in the hierarchy may operate in this options architecture to perform learning for their respective problem type. Giving the agent access to options may improve the learning rate of the agent because they will not have to relearn specific sequences of actions each time they act in the environment. It also provides a way for us to initially inject meta-heuristics of how to solve the problem by the choice of options provided to each agent.

Imitation learning is an approach to reinforcement learning that uses examples of solutions to the MDP and has the agent imitate those solutions or use them as a basis for generalization. The reason for this is that the general reinforcement learning problem and solution seek to solve problems in any domain. The issue is that by being such a general algorithm, it sacrifices the ability to inject knowledge that we have about the domain the agent is operating. Imitation learning provides a teacher and student-like way of injecting bias for the system. This bias can then be used to bootstrap exploration in such a large state and action space. This is a much more efficient way to initialize learning agents then having them start somewhere random in such a huge space of possible policies.

In some embodiments, a Closed Loop Optimization system in the context of PCB Design Automation may be viewed as a System of Agents ("SOAs") performing a sequence of actions to progressively achieve PCB Design closure of the PCB under consideration. Accordingly, important design flow steps such as Placement, Via-Strategy and Routing may fall under the domain of each hierarchical agent. The closed feedback loop may be configured to solve problems over long time horizons and in a joint manner. The main issues faced by a learning agent in this domain are credit assignment and temporal abstraction. Embodiments of the present disclosure may solve these issues by using a domain knowledge inspired hierarchical agent to break up the optimization into two levels of sub-optimization problems. The lowest level of the agent hierarchy trains an agent on each of the design flow steps, for example, Place, Via, and Route. These agents learn to excel at their specific tasks under a specific state representation. The top level of the hierarchy may then be trained on these lower level "experts" to learn which one to dispatch given the state of the board it receives.

In some embodiments, the system of agents may correspond with the RL system that was described above, with a particular MDP described by our own specific representations. In some embodiments, the state representation may include a combination of one or more datatypes, some of which may include, but are not limited to, scalars, images, and graphs. Accordingly, embodiments of RL process 10 may utilize board images, scalars containing pertinent information such as wire length and board dimensions, and graphs of connectivity in order to provide the agent the most complete picture of the current state of the design.

In some embodiments, the action space may be comprised of the primitive (or incremental) actions and complex options/actions. Some examples of the incremental actions performed by the system of agents may include, but are not limited to, via insertion, layer changes, via sharing, component movement, via movement, etc. The complex actions listed above may have variations such as Genetic or Analytical Placement, hyperparameter specifications for complex algorithms (such as number of generations, number of routing passes, etc.), Via-Strategy styles (e.g. Random vs. H-V seed, insert layer flow vias, etc.). The primary component of the reward for completing an action may include the routeability of the design state. In the example of placement and via-strategy complex and primitive actions, this routeability may be the inferred routeability from the respective machine learning model that has been trained using the corresponding classes of states such as placed or Via/layer assigned states.

In some embodiments, once properly trained, RL process 10 may be configured to solve the long time horizon issue by breaking up time based off which agent is dispatched. The credit assignment problem may also be solved due to the reward structure of the problem. Each low-level agent may receive dense feedback from a CNN that evaluates the expected routeability of the board after each action taken by the agent. Accordingly, the agent may very quickly learn the effect of its actions on value. The high-level agent may also receive a reward based on routeability of the board after its sub-agent has finished acting. In order to combat conflicting goals between two agents (the joint optimization issue), RL process 10 may use a single, shared representation between all agents so that actions taken by one agent may allow the reward function to take into account whether the action may affect routeability by another low level agent. Overall, this system will be able to learn at a very high level of abstraction what needs to be done on a board to push it towards design closure.

In some embodiments, the definition of a state of a PCB design would be a representation that uniquely captures the PCB design state after a specific action (complex or primitive) has been performed. The ideal format of the design state may then be the entire design database after the action has been performed. Unfortunately, using the database to represent a state in reinforcement learning may not work for a variety of reasons. Since the state space is huge, the reward and environment mechanism will ultimately have to be encapsulated in a trained deep-learning (DL) model. Hence, a state representation will have to obey the requirements of feature vector representations. Further, on disk and in memory storage of each design snapshot DBs will become intractable regarding lookup compute time and storage space.

In some embodiments, RL process 10 may be configured to generate a feature-vector based encoding of the design which may uniquely capture the spatial as well as connectivity features of the design. This may be achieved using a number of techniques, which are discussed in further detail below. Some techniques may include, but are not limited to, using image representations of different views of the design (e.g., Rectangular Uniform wire DensitY ("RUDY"), Design image including flight-line connections), using scalar values (such as board dimensions, number of discrete components, number of fixed components, number of signal and power nets, total wire length, etc.), and/or encoding of the connectivity graph using new model architectures such as Graph Convolutional Networks (GCN's).

In some embodiments, RL process 10 may utilize one or more additional and novel encoding mechanisms to uniquely correlate the above feature vectors. Some of these may include, but are not limited to, using device identifiers for pixel values within images and the same identifiers for nodes in the GCNs, etc.

In some embodiments, the granularity of the actions a system of agents chooses to perform may change depending on the policy or its upper level agent. For example, fine-grained actions, or primitive actions, may be those that are applied to individual objects in a design. For instance, changing the layer of a connection, moving the position of a component, and adding a new via in a connection. These primitive actions may incrementally improve the design without having to make significant changes and is thus faster to perform and evaluate. Alternatively, complex actions usually result in more fundamental changes to the design. For example, a complex action may be a collection of ordered primitive actions or an analytical/genetic optimization process. They may significantly change the whole design in one or more aspects such as placement, via strategy and routing. A complex action may help the system of agents avoid local optima and more radically explore the problem space at the cost of requiring more time to perform and evaluate the action. Therefore, having both primitive and complex actions gives the system of agents more degrees of freedom, and they complement each other in terms of optimization performance and runtime performance.

In some embodiments, a reward function may serve as the system designer's way of communicating the type of behavior that may be desired from a reinforcement learning agent. Often, in reinforcement learning, immediate rewards from actions may not be a good indication of the best path to achieving a goal. A policy may be greedy and choose to take actions that may yield the highest immediate rewards, however, in so doing, bypass states which may have yielded even higher rewards along the way. Accordingly, a reinforcement learning agent may learn by spending a certain percentage of its time in exploring actions which may not yield the highest immediate rewards but may uncover states along the way which yield higher rewards. Rewards for actions may be computed in various ways. There may be certain primitive actions such as moving or inserting a single via for which it may be impossible to compute the consequence to the overall design, hence for these primitive actions RL process 10 may assign an unbiased reward value of 0. There may be primitive actions which may cause design rule violations or other illegal consequences, hence RL process 10 may assign an aggressive penalty of a large negative number (or even −infinity) to avoid these actions. Complex actions such as running a trial of genetic optimization with specific parameters may yield a positive reward value which may be proportional to the fitness value of the complex action such as a routeability metric discussed herein. As discussed above, RL process 10 may also combine rewards from different metrics to give an overall reward to the agent. There may be reward functions (or neural networks) that approximate how well a design is performing through its signal and power integrity (SI/PI) or its thermal capabilities. All of these can be added together in certain ratios to specify to our agent specific behaviors that we want the system to have, all without having to rewrite any code.

Figure 6:
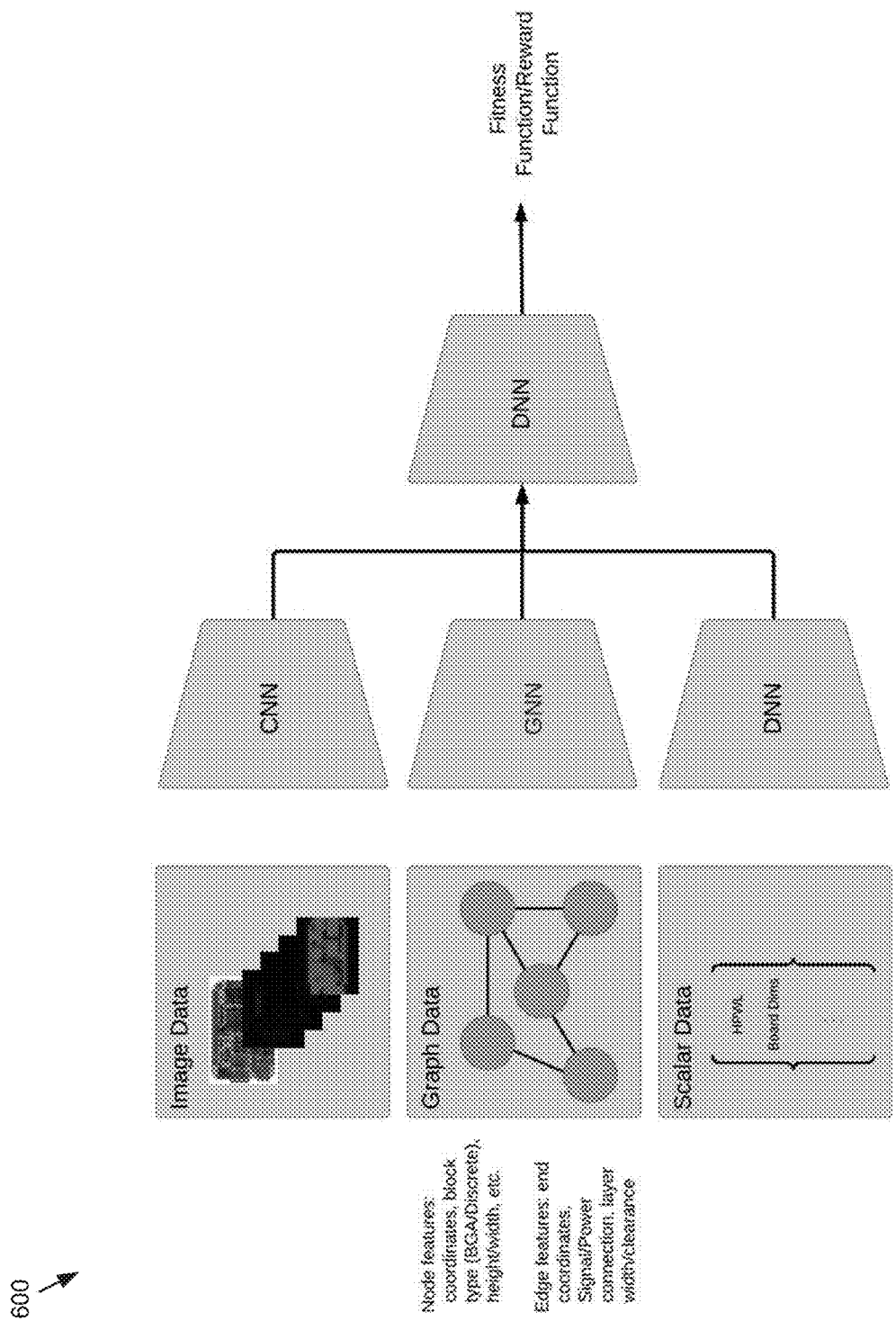
FIG. 6 is diagram depicting image-based state information in accordance with an embodiment of the present disclosure.

Referring now to FIG. 6, a diagram depicting image-based state information is provided. Example of image-based state information that will be used by the agent and routeability prediction networks. FIG. 6 includes information about image data, graph data, and scalar data. In both the agent and routeability networks, they may funnel this information down to a latent space and then combine all three sources of information with a final neural network.

In some embodiments, RL process 10 may receive a recommended action, for example, the first action or second action discussed herein. It should be noted that these actions may or may not be accepted. In some embodiments, if the recommended action is accepted, RL process 10 may be configured to perform some or all of the updating, analyzing and other relevant operations discussed herein. Additionally and/or alternatively, RL process 10 may recommend an action that is not accepted. It should be noted that in this particular scenario the updated electronic design may or may not differ from the original electronic design. In other words, the original electronic design and the updated electronic design may be the same or different designs.

In one or more embodiments of the present disclosure a computer-implemented method for floorplanning using machine learning techniques is provided. The method may include receiving the requirements for an electronic design and then analyzing these requirements using a reinforcement learning agent. The method may further include recommending a sequence of actions from the domains of placement, via assignment and routing until an electronic design meeting the original requirements has been realized. The method may further include analyzing the updated electronic design using a system of reinforcement learning agents within but not limited to the domains of placement, via assignment and routing receiving feedback from these domain environments to keep updating the electronic design until the original requirements are realized.

The reinforcement learning agent may be a hierarchical reinforcement learning agent configured to construct a hierarchy of policies or agents to decompose a design task associated with the electronic design. Analyzing the sequence of electronic design states along the way to fully realizing a design that meets all requirements may including analyzing design state which may include images, graphs or scalar feature values. Analyzing may include analyzing at least one of a primitive action or a complex action. The method may further include applying a neural network to approximate board routeability for use as a fitness function or a reward function. The method may also include receiving a completed design and analyzing the completed design using the reinforcement learning agent. The method may further include applying a reward function to the reinforcement learning agent.

Embodiments of RL process 10 may provide numerous advantages over existing approaches. RL process 10 provides a feedback-based design automation that may be configured to iteratively refine a design for as long as it takes to reach closure (e.g., it will not return an invalid board). RL process 10 may utilize a hierarchical decomposition of a design problem for reinforcement learning and the state space may be uniquely represented in order to capture multi-modal information (e.g., scalar, image, and graph) for EDA applications. In some embodiments, RL process 10 may utilize one or more abstract actions (options) that may be domain specific to EDA to simplify learning for agent. RL process 10 may also be configured to utilize neural networks to approximate board routeability for use as a fitness function and reward function. The system may use one or more completed designs as examples for a design agent to imitate (e.g., imitation learning for design). RL process 10 may also be configured to use a mixture of reward functions in order to modulate the design synthesis process without specifying specific rules or writing new code.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:
1. A computer-implemented method, comprising:
receiving, using a processor, an electronic design;
analyzing the electronic design using a reinforcement learning agent, wherein analyzing includes analyzing a feature vector including both images and scalars;
recommending a first action wherein the first action includes at least one of a place agent action, a via agent action, or a route agent action;
updating the electronic design based upon, at least in part, the first action to generate an updated electronic design;
analyzing the updated electronic design using the reinforcement learning agent, wherein analyzing includes analyzing a feature vector including both images and scalars;
recommending a second action wherein the second action includes at least one of a place agent action, a via agent action, or a route agent action; and updating the updated electronic design based upon, at least in part, the second action to generate a second updated electronic design.

2. The computer-implemented method of claim 1, wherein the reinforcement learning agent is a hierarchical reinforcement learning agent configured to construct a hierarchy of policies or agents to decompose a design task associated with the electronic design.

3. The computer-implemented method of claim 1, wherein analyzing the electronic design or analyzing the second electronic design includes analyzing a dynamically expanding corpus including at least one image, at least one scalar, and at least one graph.

4. The computer-implemented method of claim 1, wherein analyzing includes analyzing at least one of a primitive action or a complex action.

5. The computer-implemented method of claim 1, further comprising:
applying a neural network to approximate board routeability for use as a fitness function or a reward function.

6. The computer-implemented method of claim 1, further comprising:
receiving a completed design; and
analyzing the completed design using the reinforcement learning agent.

7. The computer-implemented method of claim 1, further comprising:
applying a reward function to the reinforcement learning agent.

8. A non-transitory computer-readable storage medium having stored thereon instructions, which when executed by a processor result in one or more operations, the operations comprising:
receiving, using a processor, an electronic design;
analyzing the electronic design using a reinforcement learning agent, wherein analyzing includes analyzing a feature vector including both images and scalars and wherein the images include electronic design representations and the scalars are selected from the group consisting of: printed circuit board dimensions, wirelength, number of nets, number of packages, and discrete components;
recommending a first action wherein the first action includes at least one of a place agent action, a via agent action, or a route agent action;
updating the electronic design based upon, at least in part, the first action to generate an updated electronic design;
analyzing the updated electronic design using the reinforcement learning agent, wherein analyzing includes analyzing a feature vector including both images and scalars and wherein the images include electronic design representations and the scalars are selected from the group consisting of: printed circuit board dimensions, wirelength, number of nets, number of packages, and discrete components;
recommending a second action wherein the second action includes at least one of a place agent action, a via agent action, or a route agent action; and
updating the updated electronic design based upon, at least in part, the second action to generate a second updated electronic design.

9. The computer-readable storage medium of claim 8, wherein the reinforcement learning agent is a hierarchical reinforcement learning agent configured to construct a hierarchy of policies or agents to decompose a design task associated with the electronic design.

10. The computer-readable storage medium of claim 8, wherein analyzing the electronic design or analyzing the second electronic design includes analyzing a dynamically expanding corpus including at least one image, at least one scalar, and at least one graph.

11. The computer-readable storage medium of claim 8, wherein analyzing includes analyzing at least one of a primitive action or a complex action.

12. The computer-readable storage medium of claim 8, further comprising:
applying a neural network to approximate board routeability for use as a fitness function or a reward function.

13. The computer-readable storage medium of claim 8, further comprising:
receiving a completed design; and
analyzing the completed design using the reinforcement learning agent.

14. The computer-readable storage medium of claim 8, further comprising:
applying a reward function to the reinforcement learning agent.

15. A system, comprising:
at least one processor configured to receive an electronic design, the at least one processor further configured to analyze the electronic design using a reinforcement learning agent, wherein analyzing includes analyzing a feature vector including both images and scalars and wherein the images include electronic design representations and the scalars are selected from the group consisting of: printed circuit board dimensions, wirelength, number of nets, number of packages, and discrete components, the at least one processor further configured to recommend a first action, wherein the first action includes at least one of a place agent action, a via agent action, or a route agent action, the at least one processor further configured to update the electronic design based upon, at least in part, the first action to generate an updated electronic design, the at least one processor further configured to analyze the updated electronic design using the reinforcement learning agent, wherein analyzing includes analyzing a feature vector including both images and scalars and wherein the images include electronic design representations and the scalars are selected from the group consisting of: printed circuit board dimensions, wirelength, number of nets, number of packages, and discrete components, the at least one processor further configured to recommend a second action wherein the second action includes at least one of a place agent action, a via agent action, or a route agent action, the at least one processor further configured to update the updated electronic design based upon, at least in part, the second action to generate a second updated electronic design.

16. The system of claim 15, wherein the reinforcement learning agent is a hierarchical reinforcement learning agent configured to construct a hierarchy of policies or agents to decompose a design task associated with the electronic design.

17. The system of claim 15, wherein analyzing the electronic design or analyzing the second electronic design includes analyzing a dynamically expanding corpus including at least one image, at least one scalar, and at least one graph.

18. The system of claim 15, wherein analyzing includes analyzing at least one of a primitive action or a complex action.

19. The system of claim 15, wherein the at least one processor is further configured to apply a neural network to approximate board routeability for use as a fitness function or a reward function.

20. The system of claim 15, wherein the at least one processor is further configured to receive a completed design and analyze the completed design using the reinforcement learning agent.

\* \* \* \* \*